BEST AVAILABLE COPY
W. H. Livingston,
Hand Saw.
No. 1,452. Reissued Apr. 14, 1863.
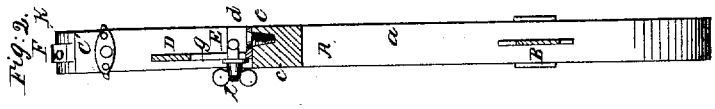
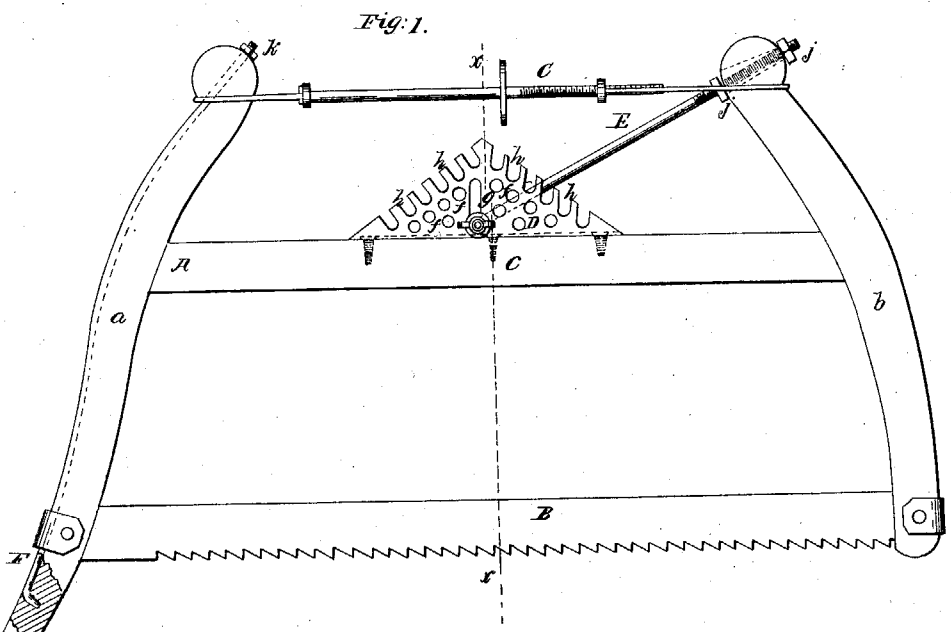
Witnesses:
Inventor:

BEST AVAILABLE COPY

UNITED STATES PATENT OFFICE.

WILLIAM H. LIVINGSTON, OF NEW YORK, N. Y.

IMPROVEMENT IN WOOD-SAW FRAMES.

Specification forming part of Letters Patent No. 30,076, dated September 18, 1860; Reissue No. 1,452, dated April 14, 1863.

*To all whom it may concern:*

Be it known that I, WILLIAM H. LIVINGSTON, of the city, county, and State of New York, have invented a new and useful improvement in handsaws, (No. 1,) those which are strained in a frame—such, for instance, as buck-saws for sawing fire-wood, and scroll-saws used by mechanics for sawing scrolls; and I do hereby declare that the following is a full, clear, and exact description of the same, reference being had to the annexed drawings, making a part of this specification, in which—

Figure 1 is a side view of my invention; Fig. 2, a section of the same taken in the line *x x*, Fig. 1.

Similar letters of reference indicate corresponding parts in the two figures.

The nature of my said invention consists in a brace applied to the frame of a handsaw, said brace extending from the cross-bar to the upper end of the frame at the side opposite to where the power is applied. By this device the saw-frame is prevented from changing its form or working out of shape while in use, because the application of the power being at one end and acting through the cross-bar upon the opposite end piece, that end piece cannot change its angle to the said cross-bar because of the said brace applied at this point forming a triangle that insures the end of the cross-bar always remaining in close contact with the end piece of the frame, because the said brace is on the opposite side of the cross-bar to the point at which the power (as transmitted) acts to draw the saw through the wood.

To enable those skilled in the art to fully understand and construct my invention, I will proceed to describe it.

A represents a saw-frame, such as are commonly termed "buck-saws;" B, the saw secured therein and properly strained by a screw-rod, C, applied to the upper parts of the end pieces, *a b*, of the frame. These parts are of usual construction, and therefore do not require a minute description.

To the center of the cross-bar *c* of the saw-frame A there is secured a metal plate, D. This plate may be of trilateral form, having a lip or flange, *d*, at its lower end, through which screws *l* pass into the cross-bars *c* and secure the plate thereto.

The plate D is perforated with holes *f*, and provided with a slot, *g*, and has its upper edges notched, as shown at *h*. In the slot *g*, in any of the holes *f*, or in any of the notches *h*, one end of a metal rod, E, is fitted and secured by a thumb-nut, *i*. The opposite end of the rod E passes through a taper opening in the upper part of the end-piece *b* of the frame, and the rod has a screw-thread cut on it, and two jam-nuts, *j j*, placed on it, one at each side of the end piece, as shown clearly in Fig. 1.

The rod E serves to brace and strengthen the frame, and the metal plate D strengthens the cross-bar *c*, preventing the same from bending or springing in any direction. This brace E acts in the manner aforesaid to keep the frame from varying its shape while in use, and causes the end of *c* always to remain in intimate contact with *b*, because the power applied through *c* acts to draw the saw through the wood, said saw being at one end of *b*, while the brace E takes the other end of *b*. The holes, slot, and notches in the plate D admit of the brace-rod being attached to it at different points, and thereby compensate for the varying position of the end piece *b*, to which it is attached. For instance, if the upper part of the end piece *b* is drawn inward or toward *a*, under the action of the screw-rod C, the inner end of the brace-rod E must be fitted in a hole, *f*, or notch *h*, nearer *a*; or the inner end of the brace-rod must be depressed in the slot *g*, or the jam-nuts *j j* may be adjusted at the upper and outer part of the brace-rod E. This adjustment of the brace-rod E is important, for if a rigid rod were used the saw B would be necessarily strained by the movement of one end piece *a*, the rod E keeping the end piece *b* stationary; hence the end piece *a* would require to be moved just double the distance that it would be were both end pieces movable, and consequently by the employment of a fixed brace-rod the symmetry of the frame cannot be preserved.

I do not confine myself to any particular means for adjusting the inner end of rod E in the plate D, for various plans may be used.

In the outer edge of the end piece *a* of the frame A there is made a longitudinal groove, in which a metal rod, F, is fitted. This groove extends nearly the whole length of *a*, and the lower end of this rod F is bent inward in hook form, as shown in Fig. 1, and the upper end passes through the upper end of the end piece *a*, and has a screw-nut, *k*, on it. The rod F is strained perfectly taut in the end piece *a* by screwing up the nut *k*, and said rod strengthens the end piece, preventing it from breaking while the saw is manipulated in the performance of its work. The end piece *b* may be strengthened in a similar manner.

Having thus described my invention, what I claim as new, and desire to secure by Letters Patent, is—

1. The brace E, applied to the frame of a hand saw between the cross-piece and the end piece of said frame, in the manner and for the purposes substantially as specified.

2. The combination of the brace-rod E and metal plate D, arranged or applied to the saw-frame, substantially as and for the purpose set forth.

WM. H. LIVINGSTON.

Witnesses:
M. M. LIVINGSTON,
L. B. BENDRE.